No. 747,298. PATENTED DEC. 15, 1903.
T. CARROLL.
CLUTCH.
APPLICATION FILED JULY 29, 1901. RENEWED MAY 5, 1903.
NO MODEL.
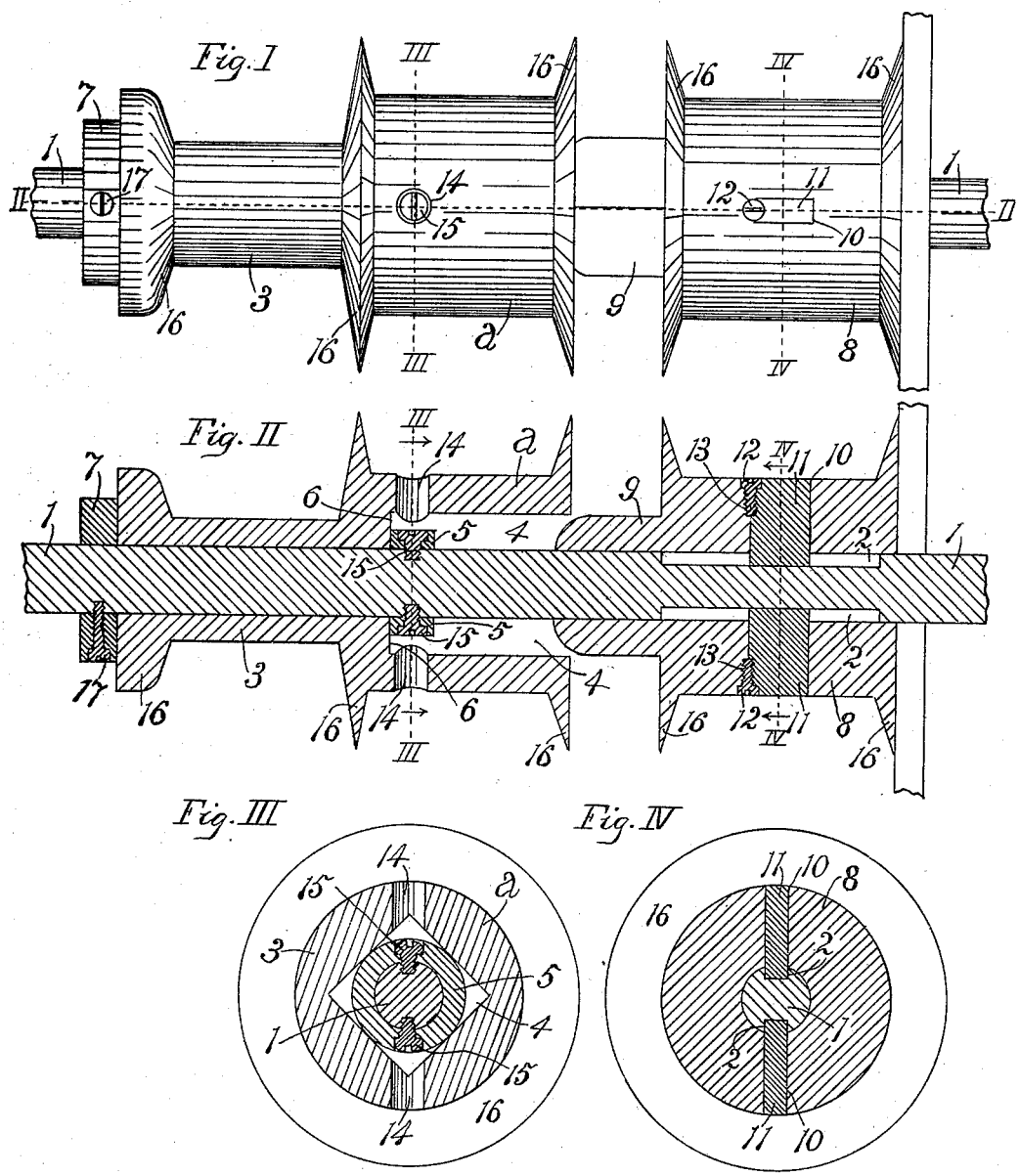

No. 747,298.

Patented December 15, 1903.

UNITED STATES PATENT OFFICE.

TIMOTHY CARROLL, OF ANAHEIM, CALIFORNIA.

CLUTCH.

SPECIFICATION forming part of Letters Patent No. 747,298, dated December 15, 1903.

Application filed July 29, 1901. Renewed May 5, 1903. Serial No. 155,788. (No model.)

*To all whom it may concern:*

Be it known that I, TIMOTHY CARROLL, a citizen of the United States, residing at Anaheim, in the county of Orange and State of California, have invented a new and useful Improvement in Clutches, of which the following is a specification.

The object of this invention is to provide a simple and strong clutch device for connecting and disconnecting a revolving spool to rotate with and to be free from rotation with a rotary shaft.

One object of my invention is to provide means whereby a large number of winding-spools may be arranged on a single shaft and said spools be readily connected and disconnected to rotate with and to be free from rotating with the rotary shaft.

Another object of this invention is to provide means whereby one or more sets of integral clutch members and their retaining devices may be mounted on a shaft from either end without the use of split or two-part elements.

With this and other objects in view the invention consists in the specific construction of the clutch members and in the means for mounting them on a shaft in sets in such manner that one member is rotatable and the other is longitudinally movable, but is non-rotatable.

The accompanying drawings illustrate my invention.

Figure I is a side elevation of a windlass embodying my invention. Portions of the shaft and the means for rotating the shaft are omitted in order to contract the view. Fig. II is an axial section on line II II, Fig. I. Fig. III is a cross-section on line III III, Figs. I and II, looking in the direction of the arrow. Fig. IV is a cross-section on line IV IV, Figs. I and II, looking in the direction of the arrow.

1 indicates a rotary shaft furnished with a splineway 2. In practice any desired number of splineways may be provided. In the drawings two splineways are shown.

3 indicates a spool journaled on the shaft and furnished with a socket 4, opening toward the splineway.

5 indicates a collar fixed on the shaft inside the socket to engage the bottom 6 of the socket to prevent the spool from moving endwise toward the splineway.

7 indicates a collar fixed on the shaft to engage the end of the spool opposite the socket to prevent endwise movement of the spool away from the splineway.

8 indicates a sliding member mounted on the shaft furnished with a projection 9 to seat in the socket 4 to prevent relative rotation between the socketed member or spool 3 and the sliding member 8. Said sliding member is also furnished with a lateral opening 10, communicating with the splineway 2.

11 indicates a spline in said lateral opening extending into the splineway 10, and 12 indicates means for fastening the spline in said opening. Such means consist in a screw which is screwed into a socket 13, formed in part in the spline 11 and in part in the wall of the opening 10, in which said spline is inserted. The spool is furnished with a lateral opening 14, communicating with the socket 4 at the inner end thereof.

15 indicates a screw inserted through the collar 5 and screwed into the shaft to hold the collar in place.

The cross-section of the socket 4 and of the male member or projection 9 of the clutch is such as to prevent rotation of the spool and the sliding member relative to each other when the male member or projection 9 is inserted into the socket 4. Preferably the cross-section of such projection 9 and socket 4 is square or otherwise angular.

In order to provide for utilizing the spool to its fullest extent, the portion *a* of the spool which extends around the socket 4 will have an external cylindrical form to serve as a winding member upon which a rope or other flexible connection can be readily applied. The sliding member 8 is also constructed to form a cylinder for winding a flexible connection. 16 indicates flanges at the ends of the several winding portions of the spool and the sliding member.

In practice the spool can readily be fastened against endwise movement upon the shaft by means of the collar 7 and the screw 17, which fastens the collar 7 to the shaft, and also by the collar 5, which is inserted into the socket 4 and brought to the appropriate place and fastened with the screw 15, turned by means of a screw-driver inserted through the lateral hole 14. Then to connect or disconnect the spool and the rotary shaft the sliding member 8 will be slid by hand or by any suitable means (not shown) which the constructor may provide therefor to bring its male member 9 into and out of the socket 4.

In assembling the clutch members and the rings on the shaft if the member 3 be placed in the shaft spool end first, as from the right-hand end of the shaft in the drawings, and it be impossible to move it beyond the point where it is to be secured, as when it abuts against a bearing or a set of clutches already in place, it will be seen that the only way that the ring 5 can be secured in position is by means of the opening 14, which is located virtually at the bottom of the axial recess of the member and through which the screw-driver must be inserted for tightening the screw or for loosening it for removing the ring and the clutch member.

In practice any number of spools may be applied on a single shaft, and said shaft is to be provided with splineways for the sliding members, respectively, for the spools and also with screw-threaded sockets for the screws which fasten the collars in place. The collar 5 serves to position the spool, but does not interfere with the operation of the sliding member 8.

By providing the shaft 1 and the member 3, constructed to slide along and to rotate on said shaft, the collars 5 and 7, arranged to slide along said shaft, and means 15 and 17 to fix said collars to said shaft to hold said member 3 against endwise movement it becomes possible to apply the spool at any appropriate point on said cylindrical shaft of uniform diameter. By providing the member 8, constructed to slide along the shaft, and means comprising the splineway 2, the spline 11, and the screw 12, to hold said member against rotation and to allow it to slide along the shaft a plurality of members of this kind may be assembled on the shaft at the appropriate places and used as one of the clutch members with a minimum amount of cutting away of the shaft and of the member to accomplish the purposes above stated.

By arranging the collars 5 so that they slide along the shaft the convenience of assembling the clutch from the side toward which the socket opens is increased, for the reason that after the member 3 has been brought to its position from the right the ring 5 may be slid into place and there secured by means of the screw or screws 15.

What I claim, and desire to secure by Letters Patent of the United States, is—

1. The combination, with a rotatable shaft, furnished with a splineway, of two longitudinally-perforated clutch members mounted on said shaft, one of said members being perforated radially and provided with a flange at each end and an axially-arranged projection at one end, said projection being angular in cross-section; a spline removably secured in said perforation with its inner end in the splineway; the other clutch member being provided with flanges and having one end of its perforation enlarged and angular in cross-section to receive the projection of the other member; and means for holding said last-mentioned member against longitudinal movement on the shaft.

2. The combination of a rotary shaft furnished with a splineway; a spool journaled on the shaft and furnished with a socket opening toward the splineway, and also furnished with a lateral opening communicating with the socket at the inner end thereof; a collar fixed on the shaft to engage the end of the spool opposite the socket to prevent endwise movement of the spool away from the splineway; a collar inside the socket to engage the bottom of the socket; a screw inserted through the collar and screwed into the shaft; a sliding member mounted on the shaft and furnished with a projection to seat in the socket to prevent relative rotation between the spool and the sliding member, said sliding member being also furnished with a lateral opening; a spline in said lateral opening extending into the splineway; and means for fastening the spline in said opening.

3. A clutch comprising two flanged and longitudinally-perforated members, the perforation of one of said members being enlarged at one end and angular in cross-section and the other member being perforated radially and provided with a projection at one end, said projection being angular in cross-section and arranged axially to fit within the enlarged portion of the perforation of the other member and a spline in said radial perforation.

In testimony whereof I have signed my name to this specification, in the presence of two subscribing witnesses, at Los Angeles, California, this 20th day of July, 1901.

TIMOTHY CARROLL.

Witnesses:
JAMES R. TOWNSEND,
JULIA TOWNSEND.